Figure 1:
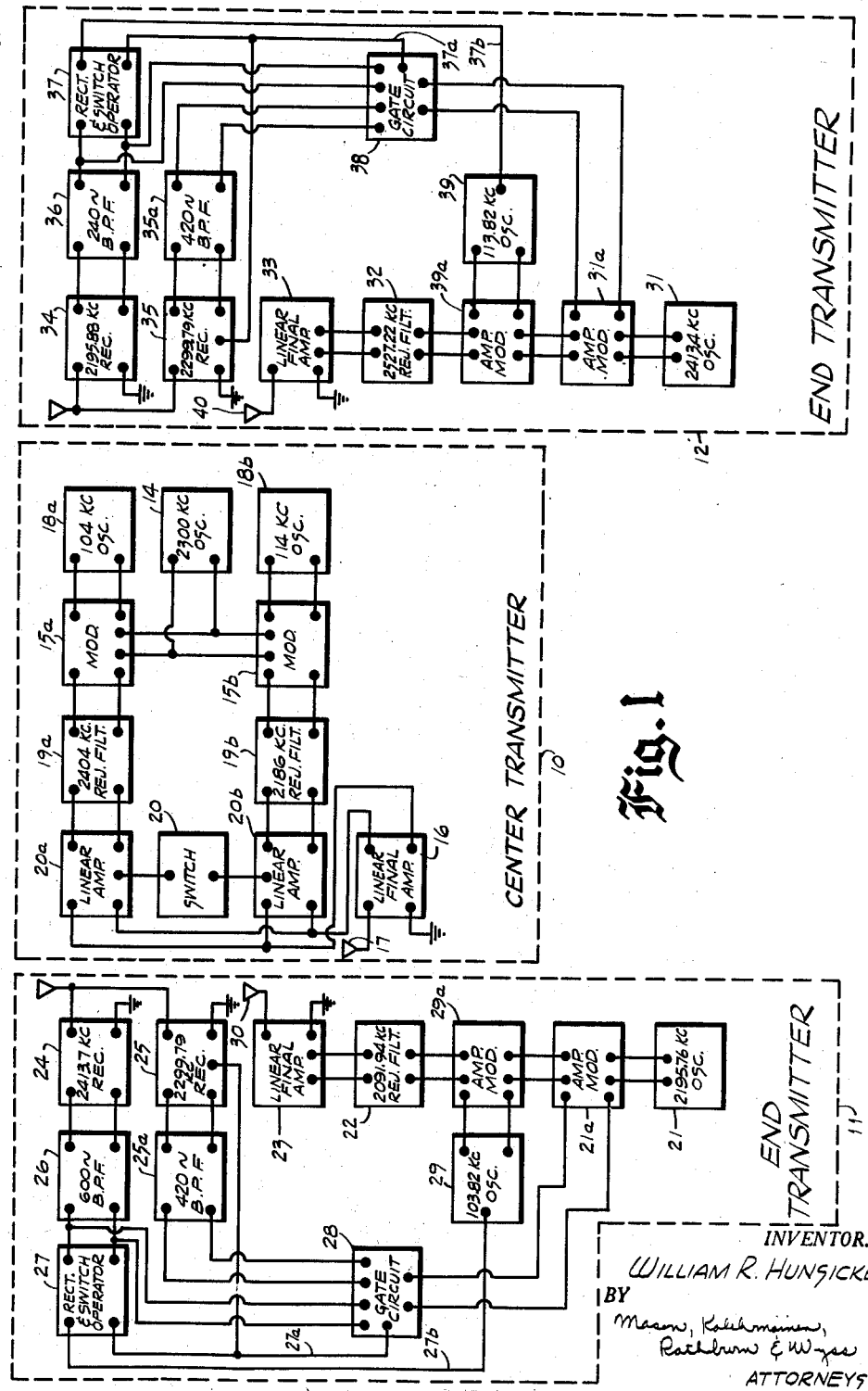

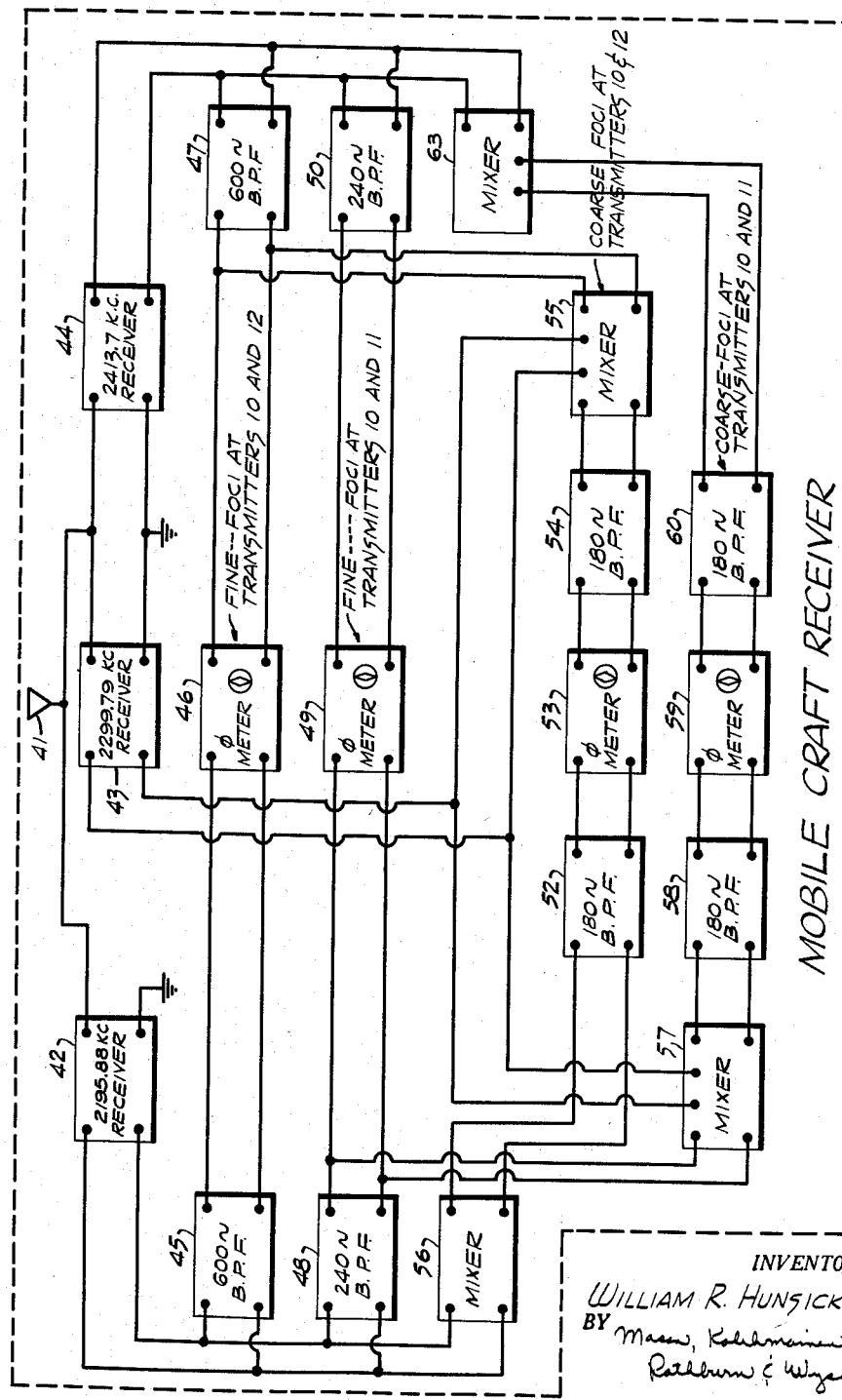

June 28, 1960 W. R. HUNSICKER 2,943,319
RADIO LOCATION SYSTEM
Filed May 3, 1955 2 Sheets-Sheet 1

INVENTOR.
WILLIAM R. HUNSICKER
BY
Mason, Kolehmainen,
Rathburn & Wyss
ATTORNEYS

2,943,319
Patented June 28, 1960

2,943,319

RADIO LOCATION SYSTEM

William R. Hunsicker, Tulsa, Okla., assignor to Seismograph Service Corporation, Tulsa, Okla., a corporation of Delaware Filed May 3, 1955, Ser. No. 505,648

4 Claims. (Cl. 343—105)

The present invention relates to radio location systems, and more particularly to improvements in radio location systems of the continuous wave phase comparison type.

Radio location systems of the class mentioned usually comprise position signal transmitters located at three or more known geographically separated points, and receiving facilities aboard each mobile craft the position of which is to be determined by receiving the signals radiated from the position signal transmitters. In such systems, the phase relationship between the continuous waves radiated from each pair of transmitters as received at a mobile receiving point changes as a function of changing position of the receiving point relative to the two transmitting points. More specifically, the phase relationship between waves radiated by each pair of transmitters of the system are characterized by iso-phase lines which are hyperbolic in contour about the transmitting points as foci. On a line connecting the pair of transmitters, these iso-phase lines are spaced apart a distance equal to one-half the mean wave length of the radiated waves and have diverging spacings at points on either side of the base line. With this system arrangement, the position of a receiving point relative to a pair of adjacent hyperbolic iso-phase lines, or more particularly within the lane defined by a pair of adjacent hyperbolic iso-phase lines, may be determined by measuring the phase relationship between the continuous waves radiated from the pair of transmitters. However, since the point of location of the receiving point along the lane within the two iso-phase lines is not indicated by such a phase measurement, it becomes necessary to employ at least three spaced transmitters, different pairs of which function to provide a grid-like pattern of intersecting lanes defined by the intersecting hyperbolic lines, in order to obtain absolute determination of the position of the receiving point. While systems of the character described are exceedingly accurate insofar as the position indications produced at the receiving point are concerned, they are characterized by a number of problems which have been found to be quite difficult to solve. Thus in order to obtain the desired indication accuracy, it is necessary so to arrange the system that phase shifts between the radiated waves are either eliminated or are compensated for during the phase comparing operation. This problem has been solved in a simple and reliable manner by utilizing the so-called "heterodyne principle" disclosed and broadly claimed in Honore Patent No. 2,148,267.

Another problem encountered in the operation of continuous wave systems is that of eliminating ambiguity from the phase measurements which provide the desired position information. Thus while the two phase measurements described above identify the position of the receiving point within two intersecting lanes defined by two intersecting pairs of hyperbolic iso-phase lines, they do not indicate the particular pair of lanes in which the indications are obtained. This means that in operating such systems, the geographic location of the receiving point relative to the transmitting stations must be known at the start of movement of the mobile craft on which the receiving equipment is located and, moreover, that the successive lanes traversed by the receiving point must be counted as the receiving point is moved relative to the grid-like pattern of hyperbolic lines defining the various lanes. It also means that a mobile craft entering the radiation pattern of the transmitters cannot utilize the radiated signals to determine its position without employing auxiliary equipment to determine the approximate position of the craft relative to the position signal transmitters. Various arrangements have been proposed for overcoming this so-called lane ambiguity problem. By far the most promising solution to the lane ambiguity problem yet discovered, relates to a system arrangement in which the difference frequency principle as disclosed and claimed in Hawkins Patent No. 2,652,558, granted September 15, 1953, is used to produce position indications having separate sensitivities, termed phase sensitivities, insofar as the lane widths or spacing of the iso-phase lines is concerned. More specifically, a plurality of low phase sensitivity position indications and a plurality of high phase sensitivity position indications are derived from signals which are radiated in pairs from each of the geographically separated signal transmission points, the low phase sensitivity indications being effective to locate the range of the high phase sensitivity indications and being characterized by widely spaced phase coincidences, representing large lane widths, and the high phase sensitivity indications being characterized by closely spaced phase coincidences, representing small lane widths. The high and low sensitivity indications are obtained by concurrently radiating at least two signals from each of the transmitting points, producing pairs of beat frequency signals in accordance with the heterodyne principle described in the Honore patent, and then heterodyning the resultant beat frequency signals to produce position indicating and reference signals for phase comparison which have phase sensitivities determined by phantom frequencies corresponding to the difference between the mean frequencies of the carrier waves from which the pairs of beat frequency signals are derived.

By utilizing the so-called difference frequency lane ambiguity resolution feature in combination with the heterodyne principle, the problem of phase synchronization between widely separated transmitters and the problem of lane identification, i.e., identification of the particular high phase sensitivity lanes within which a receiving point is located, are completely obviated. However, practical utilization of these principles in combination involves simultaneous radiation of two signals having closely spaced frequencies from each of the transmitting points. More specifically, it may become necessary to radiate two signals having frequencies separated by as little as one kilocycle simultaneously from the radiating antenna at each of the transmitting points. This gives rise to the problem of introducing high powered signals of closely related frequencies into the antenna circuit at each of the transmitting points without generating strong intermodulation or side band components which not only interfere with operation of the receiving units of the system, but may result in objectionable interference in frequency bands other than the band in which the two primary signal frequencies fall. Prior efforts to solve this instrumentation problem have been limited to the use of entirely separate signal transmission channels between the two signal generators and the antenna circuit and the provision of very sharp band pass filters, tuned to the respective frequencies of the two signals to be radiated, in the two signal channels at points immediately preceding the antenna circuit. Due to the signal power requirements normally encountered in any practical system, these filters must be capable of handling large currents at very high peak voltages with the result that large and very costly circuit components must be used therein. Moreover, filters having the requisite sharpness, i.e., frequency characteristics, are not only very difficult to tune to the desired frequency but are equally difficult to maintain tuned to the desired frequency under conditions of varying temperature and humidity. Furthermore, in order to avoid having spurious radiations of excessive values, the signal rejection characteristics of known types of filters is sure that the minimum frequency separation obtainable is about five percent of the frequencies under consideration, or about 100 kilocycles at the frequencies utilized in the present improved system. The problem of radiating at least two signals having closely related frequencies simultaneously from each of the transmitting points of a radio location system of the character described without spurious generation and radiation of strong side band or intermodulation components has been solved by the use of a radio location system of the type disclosed and claimed in applicant's copending application, Serial No. 425,271, filed April 23, 1954, now Patent No. 2,872,676 issued February 3, 1959, and assigned to the same assignee as the present invention. The present application is a continuation-in-part of this prior application.

It is an object of the present invention, therefore, to provide an improved radio location system of the character described, utilizing simultaneous transmission of two or more signals having closely related frequencies from at least one of a plurality of signal transmission points, in which the above mentioned problem of simultaneous signal radiation without the generation of strong side band or intermodulation components is entirely eliminated in a simple, economical and reliable manner.

According to another object of the present invention, the problem of simultaneously radiating two signals having closely related frequencies from one or more of the transmission points of the system is entirely obviated without resorting to the use of high cost filters having relatively unstable signal transmission characteristics.

It is a further object of the invention to provide an improved transmission system for use in radio location systems of the character described which is free from the above mentioned difficulty.

It is still another object of the invention to provide a radio position finding system of the character described which combines economy of the frequency spectrum required with freedom from phase synchronization problems and yet provides precise and non-ambiguous position indications to any desired number of system users.

It is a still further object of the invention to provide a radio position location system of the character described which is so arranged that both high phase sensitivity and low phase sensitivity position indications may be obtained at any number of receiving points while employing a minimum number of position indicating signal frequencies which are suitable for efficient long range propagation and certain of which may be relatively closely related in frequency and simultaneously propagated from the same transmission point.

The invention, both as to its organization and method of operation, together with further objects and advantages thereof, will best be understood by reference to the following specification taken in connection with the accompanying drawings, in which:

Figs. 1 and 2 when laid one above the other in the order named diagrammatically illustrate an improved radio location system characterized by the features of the present invention, the transmission facilities of the system being shown in Fig. 1 and one of the receivers being shown in Fig. 2.

Referring now to the drawings and more particularly to Figs. 1 and 2 thereof, the present improved radio location system there illustrated comprises three geographically separated transmitters or transmitting units 10, 11 and 12 for radiating position signals to any number of mobile receiving units, one of which is generally identified by the reference numeral 13 (Fig. 2), which may be carried by vessels or vehicles operating within the radius of transmision of the three identified transmitting units. The center transmitter 10 is preferably spaced at approximately equal and relatively large distances from the end transmitting units 11 and 12 and these three units are so positioned that the line bisecting the points of location of the radiating antennas 17 and 30 of the units 10 and 11 is angularly related to the line bisecting the points of location of the radiating antennas 17 and 40 of the units 10 and 12.

The center transmitter 10 is equipped continuously to radiate a signal having a frequency of 2300 kilocycles and alternately to radiate signals having frequencies of 2414 and 2196 kilocycles. The end transmitter 11 is adapted continuously to radiate a signal having a frequency of 2195.76 kilocycles which, during alternate intervals of operation, is modulated with a 103.82 kilocycle signal with the lower side band suppressed and, during the intervening intervals of operation, is simultaneously modulated with reference signals having frequencies of 420 and 600 cycles. The end transmitter 12, on the other hand, is adapted continuously to radiate a signal having a frequency of 2413.4 kilocycles which, during the alternate intervals described above, is simultaneously modulated with reference signals of 240 and 420 cycles and, during the intervening intervals described above, is modulated with a 113.82 kilocycle signal with the upper side band suppressed. The mobile receiving unit 13 responds to the waves radiated from the transmitters 10, 11 and 12 in a manner to be described hereinafter and produces a pair of fine position indications accurately to identify the position of the mobile receiving unit and a pair of coarse position indications for resolving the ambiguity of the fine position indications.

To effect the results described above, the equipment provided at the center transmitter 10 comprises an oscillator 14 developing output signals having a frequency of 2300 kilocycles, a pair of oscillators 18a and 18b for developing output signals having frequencies of 104 kilocycles and 114 kilocycles, respectively, a pair of modulators 15a and 15b for developing sum and difference frequencies from the input signals applied thereto, a pair of frequency selective rejection filters 19a and 19b for eliminating undesired frequencies developed by the modulators, a pair of linear amplifiers 20a and 20b for alternately impressing the signals passed by rejection filters 19a and 19b as selected by the switch 20, upon the input terminals of a linear final amplifier 16 through which the signals passed by the linear amplifiers 20a and 20b are alternately impressed upon a transmitting antenna circuit including a single radiating antenna 17. The equipment provided at the end transmitter 11 includes two receivers 24 and 25 center tuned respectively to receive signals having frequencies of 2414 kilocycles and 2300 kilocycles from the transmitter 10 and to receive signals separated from these signals by only a few hundred cycles in frequency from the transmitter 12, a 600 cycle band pass filter 26 for selectively passing a 600 cycle beat frequency signal developed at the output terminals of receiver 24, a 420 cycle band pass filter 25a for selectively passing a 420 cycle beat frequency signal developed at the output of the receiver 25, a rectifier and switch operator circuit 27 for selectively performing certain control operations described more fully below, and a gate circuit 28 for selectively passing beat frequency signals developed at the output sides of the two receivers 24 and 25 to the signal radiating facilities of the transmitter under the control of the rectifier and switch operator circuit 27. The signal radiating facilities of this transmitter comprise an oscillator or signal generator 21 which operates continuously and develops a signal output having a frequency of 2195.76 kilocycles, a modulator unit 21a for modulating the output signal of the generator 21 with 420 cycle and 600 cycle signals from the gate circuit 28, a second oscillator or signal generator 29 having an output frequency of 103.82 kilocycles which is selectively operated under the control of the rectifier and switch operator circuit 27, an amplitude modulator 29a which develops sum and difference frequency signals from the signals applied across its input terminals from oscillators 21 and 29, a frequency selective rejection filter or side band eliminator 22 for eliminating undesired signals developed by the amplitude modulator 29a, and a linear final amplifier circuit 23 through which signals passed by the rejection filter 22 are supplied to an antenna circuit including a single radiating antenna 30.

Similarly, the end transmitter 12 comprises two receivers 34 and 35 center tuned respectively to receive signals having frequencies of 2196 kilocycles and 2300 kilocycles from the transmitter 10 and to receive signals separated by only a few hundred cycles therefrom radiated by the transmitter 11, a band pass filter 36 coupled to the output terminals of receiver 34 and designed to pass a 240 cycle beat frequency signal, a band pass filter 35a coupled to the output terminals of receiver 35 for passing a 420 cycle beat frequency signal, a rectifier and switch operator circuit 37 which responds to the signal passed by the filter 36 to perform certain control operations described below, and a gate circuit 38 having the function of selectively impressing signals developed at the output terminals of the two receivers 34 and 35 upon the signal radiating facilities of the transmitter 12 under the selective control of the rectifier and switch operator circuit 37. The signal radiating facilities of this transmitter comprise a continuously operating oscillator or signal generator 31 having an output frequency of 2413.4 kilocycles, a modulator unit 31a for modulating the output signal of the generator 31 with 240 cycle and 420 cycle signals from the gate circuit 38, a second oscillator 39 which is intermittently operated under the control of the rectifier and switch operator 37 and develops an output frequency of 113.82 kilocycles, an amplitude modulator 39a for developing sum and difference frequencies from the input signals applied thereto, a frequency selective rejection filter or side band eliminator 32 for eliminating undesired signals developed by the modulator 39a, and a linear final amplifier 33 through which signals passed by the rejection filter 32 are impressed upon an antenna circuit including a single radiating antenna 40.

Referring now to the operation of the transmitting system shown in Fig. 1, it can be seen that the oscillator 14 functions continuously to apply input signals simultaneously to the modulators 15a and 15b. The modulator 15a is also energized by the signal developed by the oscillator 18a with the result that this modulator develops the two input signals together with the sum and difference frequencies therebetween. Specifically, there appear in the modulator circuit 15a a signal having a frequency of 104 kilocycles, a center frequency of 2300 kilocycles, and the upper and lower side band frequencies of 2404 kilocycles and 2196 kilocycles. The output circuit of the modulator 15a is preferably tuned to eliminate the relatively low frequency signal of 104 kilocycles and to pass the center frequency of 2300 kilocycles together with both of the side bands to the rejection filter 19a. The latter filter is tuned to reject the upper side band signals having a frequency of 2404 kilocycles and to pass all of the other signal components developed by the modulator 15a to the linear amplifier 20a. Thus, the rejection filter 19a functions to eliminate the upper side band of the modulated signal appearing at the output of modulator 15a and, in effect, constitutes a side band suppressor. When the switch 20 energizes the amplifier 20a, the latter passes a carrier wave signal having a frequency of 2300 kilocycles together with its lower side band having a frequency of 2196 kilocycles to the linear final amplifier 16 in order to effect the radiation of the carrier and its single side band from the single radiating antenna 17.

The modulator 15b, in addition to the 2300 kilocycle signal from the oscillator 14 previously mentioned, has applied thereto the 114 kilocycle signal developed by the oscillator 18b. As a result, this modulator develops the two signals applied to its input terminals together with the sum and difference frequencies therebetween. Thus, in the modulator circuit 15b there appears a signal having a frequency of 114 kilocycles, a center frequency of 2300 kilocycles and the upper and lower side band frequencies of 2414 kilocycles and 2186 kilocycles. The output circuit of the modulator 15b is preferably tuned to eliminate the relatively low frequency signal of 114 kilocycles and to develop the center frequency of 2300 kilocycles together with both of the side bands. All of the signals passed by the output circuit of the modulator 15b are applied to the rejection filter 19b which eliminates the 2186 kilocycle lower side band signal and passes the 2300 kilocycle signal and its upper side band of 2414 kilocycles to the linear amplifier 20b. Thus, when the switching unit 20 energizes the amplifier 20b, a signal having a frequency of 2300 kilocycles and carrying a single upper side band is applied to the linear amplifier 16 for radiation from the single radiating antenna 17. Preferably, the switching rate of the unit 20 is such that the operating cycle of the system consumes approximately one-fourth of a second with the periods during which signals are alternately applied to the final amplifier from the linear amplifiers 20a and 20b being equally divided during the operating cycle. As previously indicated, during each half cycle when the switching unit 20 is conditioned to pass a signal of 2300 kilocycles and its single lower side band of 2196 kilocycles from the linear amplifier 20a to the linear final amplifier 16, this signal is impressed upon the antenna circuit including the single radiating antenna 17 while during the next succeeding interval of operation the linear amplifier 20b is rendered effective to pass a signal having a frequency of 2300 kilocycles and its single upper side band of 2414 kilocycles through the linear final amplifier 16 to the antenna 17.

With the switching unit 20 conditioned to deliver signals from the linear amplifier 20a to the linear final amplifier 16, the receiver 34 at the end transmitter 12 heterodynes the 2196 kilocycle lower side band energy contained in the signal radiated from the center transmitter with the 2195.76 kilocycle carrier wave signal continuously radiated from the end transmitter 11 and produces a 240 cycle beat frequency signal at its output terminals. This beat frequency signal is passed by the band pass filter 36 and energizes the rectifier and switch operator circuit 37 with the result that this circuit assumes a condition wherein a blocking voltage appears on signal conductor 37b to render the oscillator 39 inoperative. At the same time, an operating potential appears on signal connector 37a to place the receiver 35 in operation for the reception of signals and to condition the gate circuit 38 for the passage of signals therethrough. With the receiver 35 in operation the 2300 kilocycle carrier wave signal radiated by the center transmitter 10 is heterodyned with a 2299.58 kilocycle side band signal radiated from the end transmitter 11 in order to create a 420 cycle beat frequency signal, which signal is passed through the band pass filter 35a and through the energized gate circuit 38 to the amplitude modulator 31a. The gate circuit 38 also applies the 240 cycle signal passed by the filter 36 to the input terminals of the amplitude modulator 31a in order to effect simultaneous modulation of both 240 cycle and 420 cycle reference signals upon the 2413.4 kilocycle radio frequency signal developed by the oscillator 31. The modulated signal appearing at the output terminals of the amplitude modulator 31a is passed by both the modulator 39a and the rejection filter 32 to the linear amplifier 33 where it is applied to the transmitter antenna circuit including the radiating antenna 40.

At the end transmitter 11, the receiver 24 develops no heterodyne or beat frequency signals during this particular interval and thus the rectifier and switch operator circuit 27 is not operated. Under these conditions, a blocking voltage is applied through signal connector 27a to maintain the receiver 25 inoperative and to prevent the passage of signals through the gate circuit 28. At the same time, operating voltage is applied through signal connector 27b to the oscillator 29 in order to place the latter in operation. The oscillator 29 applies a signal of 103.82 kilocycles to the amplitude modulator 29a which also has applied thereto the 2195.76 kilocycle signal developed by the continuously operative oscillator 21. The amplitude modulator 29a develops the two signals applied to its input terminals, together with the sum and difference frequencies therebetween. Specifically, there appear in the circuit of the amplitude modulator 29a a signal having a frequency of 103.82 kilocycles, a carrier wave having a frequency of 2195.76 kilocycles and its upper and lower side bands having frequencies of 2299.58 and 2091.94 kilocycles. The output circuit of modulator 39a is preferably tuned to eliminate the 103.82 kilocycle signal and to pass the modulated carrier wave to the input terminals of the rejection filter 22 which, in turn, functions to eliminate the 2091.94 kilocycle lower side band energy and to apply the carrier and its upper side band to the final amplifier 23. Thus, the rejection filter 22 eliminates the lower side band of the modulated signal developed by the modulator 29a and, in effect, functions as a single side band suppressor. The energy passed by filter 22, comprising a carrier wave signal having a frequency of 2195.76 kilocycles and its upper side band of 2299.58 kilocycles, is applied to linear amplifier 23 for radiation from the antenna circuit including the single radiating antenna 30.

In summary, during the interval of operation just described, the center transmitter 10 is operative to radiate a carrier wave signal having a frequency of 2300 kilocycles together with a lower side band of 2196 kilocycles, the end transmitter 11 is operative to radiate a carrier wave signal having a frequency of 2195.76 kilocycles together with an upper side band of 2299.58 kilocycles and the end transmitter 12 is operative to radiate a carrier wave signal having a frequency of 2413.4 kilocycles which is simultaneously modulated with reference signals of 240 cycles and 420 cycles.

At the end of the above described transmitting interval the switching unit 20 functions to deenergize the linear amplifier 20a and at the same time to place the linear amplifier 20b in operation. As a result of this switching operation, the 2300 kilocycle carrier wave signal and its 2414 kilocycle upper side band, which is passed by the rejection filter 19b in the manner described above, is applied to the linear final amplifier 16 for radiation from the antenna 17. At the end transmitter 12, the receiver 34 no longer reproduces a 240 cycle beat frequency signal and thus the rectifier and switch operator circuit 37 is not actuated. As a result, blocking voltage is applied through signal connector 37a to prevent the passage of signals through the gate circuit 38 and to render the receiver 35 inoperative. At the same time, operating voltage is applied through signal connector 37b to place the oscillator 39 in operation. The latter oscillator applies a signal of 113.82 kilocycles to the amplitude modulator 39a simultaneously with the application thereto of the 2413.4 kilocycle signal continuously developed by the oscillator 31. The modulator 39a responds to the signals applied to its separate sets of input terminals to develop both the input signal and the sum and difference frequencies therebetween. The output circuit of the modulator 39a is preferably tuned to reject the input signal of 113.82 kilocycles and to pass both the center frequency 2413.4 kilocycles together with its upper and lower side bands having frequencies of 2527.22 kilocycles and 2299.58 kilocycles. The modulated signal appearing across the output terminals of the modulator 39a is applied to the rejection filter 32 in order to eliminate the upper side band energy having a frequency of 2527.22 kilocycles and to pass the carrier wave signal and its lower side band to the final amplifier 33. The latter amplifier supplies the signal impressed upon its input terminals to the transmitter antenna circuit for radiation from the single radiating antenna 40.

During this same interval of operation, the receiver 24 at the end transmitter 11 heterodynes the 2414 kilocycle upper side band component of the signal radiated by the center transmitter 10 with the 2413.4 kilocycle signal radiated from the end transmitter 12 with the result that a 600 cycle beat frequency signal is reproduced at its output terminals. This beat frequency signal is passed by the band pass filter 26 to energize the rectifier and switch operator circuit 27, whereupon the receiver 25 is placed in operation, the gate circuit 28 is opened and the oscillator 29 is rendered inoperative. The receiver 25 then heterodynes the 2300 kilocycle carrier wave signal radiated by the center transmitter 10 with the 2299.58 kilocycle lower side band component of the signal radiated from the end transmitter 12 during this particular interval, in order to develop a 420 kilocycle signal for application through the band pass filter 25a and through the gate circuit 28 to the amplitude modulator 21a. The gate circuit 28 also passes the 600 cycle beat frequency signal appearing at the output terminals of the band pass filter 26 to the amplitude modulator 21a, with the result that the signal developed by the oscillator 21 is simultaneously modulated with a pair of reference signals having frequencies of 420 cycles and 600 cycles. The modulated radio frequency signal developed by the amplitude modulator 21a is passed through the amplitude modulator 29a and through the rejection filter 22 to the linear amplifier 23 where it is radiated from the antenna 30.

To summarize briefly, during the second interval of operation described above the center transmitter 10 is operative to radiate a carrier wave signal having a frequency of 2300 kilocycles and its upper side band of 2414 kilocycles, the end transmitter 12 is operative to radiate a carrier wave signal having a frequency of 2413.4 kilocycles together with its lower side band of 2299.58 kilocycles and the end transmitter 11 is operative to radiate a carrier wave signal having a frequency of 2195.76 kilocycles which is simultaneously modulated with reference signals of 420 cycles and 600 cycles.

As will be evident from the above description, a single radiating antenna is provided at each of the signal transmission points where the transmitters 10, 11 and 12 are located. Thus, one antenna circuit comprising the single antenna 17 is provided at the center transmitter to radiate signals from this transmitter. Similarly, a single antenna 30 is provided at the end transmitter 11 to radiate signals from this transmitter, and a single antenna 40 is provided at the second end transmitter 12 to radiate the signals from the latter transmitter. In this regard, it will be understood from the following description of the operation of the system that radiation of all signals produced at each transmitter from one and the same radiation point, i.e., from the same radiating antenna, is essential if the accuracy inherent in phase comparison systems of the character disclosed is to be fully realized. Moreover, the economics of antenna construction, system maintenance and chart production all dictate that not more than one antenna be used at each of the three signal radiating points of the system.

The above described problem of preventing intermodulation between the signals impressed upon any one of the described antenna circuits is completely solved in an entirely simple and economical manner by employing signal channels having linear signal transfer characteristics to interconnect the signal generators of the respective transmitters with the antenna circuits embodied in the transmitters. Thus, an entirely linear signal transfer channel, completely devoid of such non-linear, intermodulation component producing devices as diodes, Class C amplifiers, and the like, and consisting of the linear amplifiers 20a and 20b and the linear final amplifier 16 is utilized to impress the signals passed by the filters 19a and 19b upon the antenna circuit embodying the single antenna 17 at the center transmitter 10. Similarly, an entirely linear signal transmission channel including the linear final amplifier 23 is utilized in transmitting two signals passed by rejection filter 22 to the antenna circuit embodying the antenna 30 in the end transmitter 11. Finally, an entirely linear channel including the linear final amplifier 33 is provided for transmitting two signals passed by rejection filter 32 to the antenna circuit embodying the antenna 40 in the other end transmitter 12. As those skilled in the art will readily appreciate, the linear final amplifiers 16, 23 and 33 and the linear amplifiers 20a and 20b may be of any one of a number of standard commercial types, none of which require expensive, non-standard circuit components. The linear final amplifiers 16, 23 and 33, for example, may be operated either Class A or Class B, although the latter is somewhat preferable due to the increased efficiency of this mode of operation.

More specifically and as will be apparent from the above explanation, the final amplifiers 16, 23 and 33 are each required to handle signals within a relatively wide band, i.e., a bandwidth in excess of 100 kilocycles, a frequency of from 2196 to 2414 kilocycles. If Class A final amplifiers 16, 23 and 33 are used, the wide band is of no consequence. However, such amplifiers are quite inefficient and, accordingly, it is preferable to use Class B amplifiers as the final amplifiers. In a Class B amplifier, however, the required wide band is associated with a decrease in the Q of the circuit, and hence a degradation of the linear characteristic of the amplifier, due to the decrease of the resonant character of the load circuit. This is essentially true of single ended Class B amplifiers. However, it is not true, at least to the same extent, of push-pull Class B amplifiers, which have the further desirable characteristic of minimizing harmonic distortion. Accordingly, the final amplifiers 16, 23 and 33 are preferably of the push-pull Class B type. Provision of the described linear signal transmission channels consisting of the elements mentioned for transferring signal energy from the points of generation thereof to the antenna circuits of the three transmitters 10, 11 and 12 solves the problem of eliminating radiation of undesired signals from each of the transmission points in an entirely simple, reliable and economical manner. The elimination of one of the side bands of each of the signals radiated from each transmission point reduces the number of signals in each signal transmission channel and, accordingly, reduces the possibility of the development of undesired signals by intermodulation. Moreover, the elimination of the side band of each of the signals reduces the band width requirements of each signal transmission channel and also reduces the number of channel frequencies required in the operation of the system.

Referring now to the mobile craft receiver 13 as illustrated in Fig. 2 of the drawings, this receiver comprises a single antenna circuit including an antenna 41 for collecting signals radiated from the three transmitters 10, 11 and 12, and for impressing these signals upon the input terminals of three receivers 42, 43 and 44. The receiver 42 is center tuned to a carrier frequency of 2195.88 kilocycles and, accordingly, is designed to receive the 2195.76 kilocycle carrier wave signal radiated from the transmitter 11 and the 2196 kilocycle lower side band component alternately carried by the signal radiated from the center transmitter 10. The receiver 43 is center tuned to a carrier frequency of 2299.79 kilocycles and, accordingly, is designed to receive and pass the 2300 kilocycle carrier wave signal radiated from the center transmitter 10, the 2299.58 kilocycle upper side band component of the signal radiated from the end transmitter 11, or the 2299.58 kilocycle lower side band component of the signal radiated from the end transmitter 12. Finally, the receiver 44 is center tuned to a frequency of 2413.7 kilocycles and, accordingly, is designed to receive and pass the 2414 kilocycle upper side band component alternately carried by the signal radiated from the center transmitter 10 and the 2413.4 kilocycle carrier wave signal radiated from the end transmitter 12. The mobile receiver 13 further comprises facilities including the 600 cycle band pass filters 45 and 47 and a phase meter 46 for providing fine or narrow lane position indications with reference to hyperbolic iso-phase lines having the signal radiating antennas 17 and 40 at the transmitters 10 and 12 as foci, coarse or wide lane position indicating facilities comprising the filter 47, two mixers 55 and 56, two additional 180 cycle band pass filters 52 and 54 and a phase meter 53 for producing indications with reference to widely spaced hyperbolic iso-phase lines also having the signal radiating antennas 17 and 40 at the transmitters 10 and 12 as foci. As explained more fully below, the described facilities are operative to produce fine and coarse position indications during periods when the switching unit 20 is effective to connect amplifier 20b to linear final amplifier 16 in order to radiate a 2300 kilocycle signal and its 2414 kilocycle upper side band from the center transmitter 10. The receiver 13 further comprises two 240 cycle band pass filters 48 and 50 and a phase meter 49 for providing fine or narrow lane position indications relative to hyperbolic iso-phase lines having the signal radiating antennas 17 and 30 as foci, and facilities including the filter 48, two additional 180 cycle filters 58 and 60, two mixers 57 and 63 and a phase meter 59 for providing coarse or wide lane position indications relative to hyperbolic iso-phase lines also having the antennas 17 and 30 of the transmitters 10 and 11 as foci. As described below, the last mentioned position indicating facilities provide position indications during periods when the switching unit 20 is operative to connect amplifier 20a to final amplifier 16 in order to effect radiation of a 2300 kilocycle carrier wave and its 2196 kilocycle lower side band from the transmitter 10.

Referring now to the operation of the above described system as shown in Figs. 1 and 2, it will be apparent that during alternate half cycles of each operating cycle the switching unit 20 renders the amplifiers 20a and 20b effective to deliver signals for radiation from the center transmitter 10. During each half cycle when the switching unit 20 is conditioned to pass signals through amplifiers 20a and to block the transmission of signals through amplifier 20b, the signals produced by the two generators 14 and 18a are mixed by the modulator 15a in order to impress a modulated carrier wave upon the input terminals of the filter 19a. The filter rejects the upper side band and passes the carrier and its lower side band through amplifier 20a upon the linear final amplifier 16 for amplification following which the signal is impressed upon the antenna circuit embodying the antenna 17 for radiation. Throughout operation of the system, the signal generators 21 and 31, respectively, provided at the end transmitters 11 and 12 are effective to produce continuous signal radiation from the transmitters in which they are respectively embodied. Thus, during each period when the amplifier 20a is effective to produce signal radiation from the center transmitter 10, this transmitter radiates a carrier wave signal having a frequency of 2300 kilocycles and its 2196 kilocycle lower side band, the end transmitter 11 radiates the carrier wave signal of 2195.76 kilocycles developed by the signal generator 21 and the end transmitter 12 radiates the carrier wave signal of 2413.4 kilocycles developed by the signal generator 31.

At the end transmitter 11, the receiver 24 only receives the carrier wave signal of 2413.4 kilocycles radiated from the transmitter 12 through operation of the signal generator 31 with the result that no beat frequency signal is produced at the output terminals thereof. Consequently, no signal is passed by the band pass filter 26 to the rectifier and switch operator circuit 27. As a consequence, the rectifier and switch operator circuit 27 assumes a condition wherein a blocking voltage of relatively high magnitude is impressed upon switching conductor 27a to block the receiver 25 against signal transmission therethrough and to block the gate circuit 28 against signal transmission therethrough. In this condition, the rectifier and switch operator circuit also removes a blocking voltage from the switch conductor 27b, thereby to initiate operation of the signal generator 29. Thus, when switching unit 20 at the center transmitter 10 is effective to deliver signals from amplifier 20a to antenna 17, the rectifier and switch operator circuit 27 functions to block the receiver 25 and the gate circuit 28 against signal transmission therethrough and to initiate operation of the signal generator 29. The latter generator impresses a signal voltage upon the modulator 29a which is modulated upon the output voltage from the signal generator 21 in order to develop a center frequency of 2195.76 kilocycles and the upper and lower side bands resulting from the 103.82 kilocycle modulation. The rejection filter 22 eliminates the lower side band and passes the carrier frequency and its upper side band for amplification by the linear final amplifier 23 and for radiation from the antenna circuit embodying the antenna 30.

At the end transmitter 12, the 2196 kilocycle lower side band component of the signal radiated from the center transmitter 10 by the antenna 17 is passed by the receiver 34 along with the 2195.76 kilocycle carrier wave signal developed by the signal generator 21 and radiated by the antenna 30. As a consequence, a 240 cycle beat frequency signal is developed at the output terminals of the receiver 34 which is selectively passed by the band pass filter 36 and impressed upon the input terminals of the rectifier and switch operator circuit 37 and also upon one of the two sets of signal input terminals of the gate circuit 38. The rectifier and switch operator circuit 37 responds to this applied signal voltage by impressing a relatively high negative blocking voltage to the switching conductor 37b which has the effect of biasing the signal generator 39 to prevent continued operation. As a consequence, this signal generator stops operating and discontinues radiation of the lower side band component having the frequency of 2299.58 kilocycles from the antenna 40 of the end transmitter 12. Application of the 240 cycle beat frequency signal to the input terminal of the rectifier and switch operator circuit 37 also causes this component to remove the negative blocking voltage from the switching conductor 37a, with the result that the receiver 35 and the gate circuit 38 are both unblocked to permit signal transmission therethrough. As a consequence, the 240 cycle beat frequency signal passed by the band pass filter 36 is transmitted through the gate circuit 38 and impressed upon the amplitude modulator 31a for modulation upon the 2413.4 kilocycle signal generator by the signal generator 31.

At the end transmitter 12, the 2300 kilocycle carrier wave signal developed by the signal generator 14 and radiated by the antenna 17 of the center transmitter 10 is heterodyned with the 2299.58 kilocycle upper side band component of the signal radiated by the antenna 30 of the end transmitter 11 in the receiver 35 to produce a 420 cycle beat frequency signal at the output side of this receiver. This beat frequency signal is selectively passed by the 420 cycle band pass filter 35a, transmitted through the gate circuit 38, and impressed upon the modulation terminals of the amplitude modulator 31a for modulation upon the signal produced by the signal generator 31 along with the 240 cycle beat frequency signal impressed upon these terminals through the filter 36 and the gate circuit 38. Thus the 2413.4 kilocycle signal developed by the signal generator 31 is amplitude modulated by the amplitude modulator 31a with the two described beat frequency signals, which for convenience have been referred to as reference signals, having frequencies of 240 cycles and 420 cycles, respectively. This amplitude modulated signal is passed through the modulator 39a and filter 32, amplified through the linear final amplifier 33 and impressed upon the antenna circuit embodying the antenna 40 for radiation from the end transmitter 12.

Summarizing the above description, it will be understood that when the linear amplifier 20a is effective to produce radiation from the center transmitter 10, a high frequency carrier signal having a frequency of 2300 kilocycles and its lower side band component of 2196 kilocycles is radiated from the center transmitter 10, a high frequency carrier wave signal having a frequency of 2195.76 kilocycles and its upper side band of 2299.58 kilocycles is radiated from the end transmitter 11, and a high frequency carrier wave signal of 2413.4 kilocycles simultaneously modulated with beat frequency reference signals of 240 cycles and 420 cycles is radiated from the end transmitter 12.

As indicated above, during each intervening half period of each system operating cycle, the switching unit 20 functions to block transmission of signals through the amplifier 20a to effect radiation of the signals passed by rejection filter 19b and passed to amplifier 20b. Thus, when the switching unit changes its condition or setting to block signal transmission through amplifier 20a and to permit signal transmission through the amplifier 20b, the 2300 kilocycle carrier wave signal and its 2414 kilocycle upper side band is passed by the last mentioned amplifier, is amplified through the linear final amplifier 16 and impressed upon the antenna circuit embodying the antenna 17 for radiation from the transmitter 10. When this occurs, the receiver 34 provided at the end transmitter 12 only receives the carrier wave signal of 2195.76 kilocycles being developed by the signal generator 21 and radiated from the transmitter 11. Accordingly, the 240 cycle beat frequency signal developed at the output terminals of the receiver 34 disappears, with the result that the rectifier and switch operator circuit 37 changes its condition or setting to apply a high negative blocking potential to the switching conductor 37a and to remove the negative blocking potential from the switching conductor 37b. In response to this operation, the receiver 35 and the gate circuit 38 are instantly blocked against further signal transmission therethrough. Removal of the negative blocking potential from the switching conductor 37b has the effect of initiating operation of the 113.82 kilocycle signal generator 39 with the result that the output signal from this generator is modulated upon the now unmodulated output signal of the signal generator 31 in the modulator 39a, and the resulting signal is passed through the rejection filter 32 in order to eliminate the upper side band. The 2413.4 kilocycle carrier wave and its 2299.58 kilocycle lower side band are amplified by the linear final amplifier 33 and impressed upon the antenna circuit embodying the antenna 40 for radiation from the transmitter 12. It will thus be understood that when the switching unit 20 operates to block the amplifier 20a and to unblock the amplifier 20b so that the signals passed by the latter are radiated from the center transmitter 10, the rectifier and switch operator circuit 37 at the end transmitter 12 instantly functions to block the receiver 35 and the gate circuit 38 against signal transmission therethrough, with the result that transmission of the above described beat frequency reference signals from the end transmitter 12 is discontinued.

At the end transmitter 11, the 2414 kilocycle upper side band component of the signal being radiated from the center transmitter 10 during this particular interval and the 2413.4 kilocycle carrier wave signal being radiated from the end transmitter 12 are received and heterodyned by the receiver 24 to produce a beat frequency output signal having a frequency of 600 cycles. This beat frequency signal is selectively passed by the band pass filter 26 and impressed upon the input terminals of the rectifier and switch operator circuit 27 and one set of signal input terminals of the gate circuit 28. The rectifier and switch operator circuit 27 responds to the applied 600 cycle beat frequency signal by removing the negative blocking potential from the switching conductor 27a and impressing a high negative blocking potential upon the switching conductor 27b. As a consequence of the latter operation, the 103.82 kilocycle signal generator 29 is instantly cut off to discontinue radiation of the upper side band component of the signal of the indicated frequency from the end transmitter 11. Removal of the blocking potential from the switching conductor 27a has the effect of unblocking the receiver 25 and the gate circuit 28 to permit signal transmission therethrough. As a consequence, the 600 cycle beat frequency signal appearing at the output terminals of the filter 26 is passed through the gate circuit 28 and impressed upon the input terminals of the amplitude modulator 21a. When the receiver 25 is unblocked for signal transmission therethrough in the manner just described, this receiver receives and heterodynes the 2300 kilocycle carrier wave signal being radiated from the center transmitter 10 with the 2299.58 kilocycle lower side band component of the signal being radiated from the end transmitter 12 to produce a beat frequency signal of 420 cycles at its output terminals which is selectively passed by the band pass filter 25a, transmitted through the gate circuit 28, and impressed upon the input terminals of the amplitude modulator 21a along with the 600 cycle beat frequency signal applied to these terminals through the filter 26 and the gate circuit 28. As a consequence of the described operations, the 2195.76 kilocycle output signal of the signal generator 21 is amplitude modulated simultaneously with beat frequency reference signals having frequencies of 420 cycles and 600 cycles, respectively. This amplitude modulated signal is passed through the modulator 29a and through rejection filter 22, is amplified through the linear final amplifier 23, and is impressed upon the antenna circuit embodying the antenna 30 for radiation from the transmitter 11.

To summarize the above description with reference to system cycle periods when the linear amplifier 20a is ineffective and the linear amplifier 20b is effective to produce signal radiation from the center transmitter 10, it is pointed out that during each such period a carrier wave signal having a frequency of 2300 kilocycles and its upper side band of 2414 kilocycles is radiated from the center transmitter 10, a high frequency carrier wave signal having a frequency of 2413.4 kilocycles having a lower side band of 2299.58 kilocycles is radiated from the antenna 40 at the end transmitter 12, and a high frequency signal of 2195.76 kilocycles modulated with two beat frequency reference signals having frequencies of 420 cycles and 600 cycles, respectively, is radiated from the antenna 30 of the transmitter 11.

Referring now more particularly to operation of the mobile craft receiver 13, it will be understood that all signals radiated from the antennas 17, 30 and 40 of the transmitters 10, 11 and 12 are collected by a single receiving antenna circuit which embodies the antenna 41. During periods when the amplifier 20b is operative, the 2300 kilocycle carrier wave signal radiated from the transmitter 10 and the 2299.58 kilocycle lower side band component of the signal radiated from transmitter 12 are accepted and heterodyned by the receiver 43 to produce a beat frequency signal having a frequency of 420 cycles which is impressed upon one set of input terminals of each of the two mixers 55 and 57. The 2413.4 kilocycle carrier wave signal radiated from the transmitter 12 and the 2414 kilocycle upper side band component of the signal radiated by transmitter 10 are accepted and heterodyned in the receiver 44 to produce a 600 cycle beat frequency signal at its output terminals which is impressed upon the input terminals of the band pass filters 47 and 50 and upon the input terminals of the mixer 63. This heterodyne signal is passed by the filter 47 and is impressed upon one set of input terminals of the phase meter 46 and upon a second set of input terminals of the mixer 55. The described heterodyne signal, is, of course, rejected by the filter 50.

With the linear amplifier 20b connected to the final amplifier 16 by the switching unit 20, 420 cycle and 600 cycle reference signals are modulated upon the 2195.76 kilocycle carrier wave radiated from the transmitter 11. This modulated carrier is accepted by the receiver 42 which functions to reproduce the two beat frequency reference signals at the output terminals thereof. These signals are impressed upon the input terminals of the band pass filters 45 and 48 and upon the input terminals of the mixer 56 in an obvious manner. Both beat frequency signals are rejected by the 240 cycle band pass filter 48. However, the 600 cycle reference signal is passed by the filter 45 and impressed upon the left hand set of input terminals of the phase meter 46.

For reasons which will be apparent to those skilled in the art, particularly by reference to the above identified Honore patent, the phase relationship between the two signals developed at the output terminals of the filters 45 and 47, as measured by the phase meter 46, is an index of the position of the receiving antenna 41 relative to two adjacent and closely spaced hyperbolic iso-phase lines having the antennas 17 and 40 respectively provided at the transmitters 10 and 12 as foci. More specifically, the spacing between the iso-phase lines along the base line connecting the two antennas 17 and 40 is equal to one-half the wave length of the mean or average of the 2414 kilocycle upper side band of the signal radiated from the transmitter 10 and the 2413.4 kilocycle carrier wave radiated by the transmitter 12. At points removed from the base line, the iso-phase lines, of course, diverge and are somewhat more widely spaced. However, since one-half wave length of a signal having a frequency of approximately 2414 kilocycles is equal to about 204 feet and the phase meter 46 measures and indicates a 360° phase shift during movement of the antenna 41 across one lane, i.e., a distance equal to the spacing between two adjacent iso-phase lines, it will be understood that the phase meter 46 provides a fine or narrow lane position indication.

To obtain the coarse or wide lane position indication, the 600 cycle heterodyne signal developed at the output terminals of the filter 47 is mixed with the 420 cycle heterodyne signal developed at the output terminals of the receiver 43 in the mixer 55 to produce a 180 cycle double heterodyne signal which is passed by the filter 54 and impressed upon the right hand set of input terminals of the phase meter 53. To the same end, the 420 cycle and 600 cycle reference signals developed at the output terminals of the receiver 42 are heterodyned by the mixer 56 to produce a second double heterodyne signal of 180 cycles which is passed by the filter 52 and impressed upon the left hand set of input terminals of the phase meter 53. Thus the two double heterodyne signals impressed upon the two sets of input terminals of the phase meter 53 are phase compared by this meter to produce an indication of the phase relationship therebetween. For reasons which will be apparent from an understanding of the difference frequency principle as fully disclosed in United States Patent No. 2,652,558 granted September 15, 1953 to James E. Hawkins and assigned to the same assignee as the present application, it will be understood that the phase relationship between the 180 cycle double heterodyne signals applied to the input terminals of the phase meter 53 varies as a direct function of the position of the antenna 41 relative to two adjacent iso-phase lines having the antennas 17 and 40 of the two transmitters 10 and 12 as foci and having a spacing which is determined by the difference between the mean or average frequencies of the two sets of signals radiated from the two transmitters 10 and 12. More specifically, along the base line connecting the two antennas 17 and 40 this spacing is equal to one-half the wave length of a signal having a frequency of 113.91 kilocycles, a distance of approximately 4320 feet, which is approximately 21 times greater than the spacing between the iso-phase lines relative to which position indications are provided by the phase meter 46 of the fine or narrow lane position indicating facilities. The accuracy of the coarse lane position indicating facilities including the phase meter 53 is, of course, far less than that of the fine or narrow lane position indicating facilities including the phase meter 46. It has been found, however, that when the coarse or wide lane position indicating facilities operate on lane widths which are approximately 20 times greater than the width of the lanes within which the fine or narrow lane position indicating facilities operate, the accuracy of the coarse or wide lane facilities is entirely adequate to insure identification of the particular narrow lane in which fine indications are being provided by the fine or narrow lane position indicating facilities comprising the phase meter 46. To summarize, during each period when the linear amplifier 20b is in operation, the phase meters 46 and 53 respectively provide fine and coarse position indications relative to two sets of differently spaced hyperbolic iso-phase lines both sets of which have the antennas 17 and 40 respectively provided at the transmitters 10 and 12 as foci.

During periods when the linear amplifier 20a is connected to the linear final amplifier 16 by the switching unit 20 at the center transmitter 10, the 2300 kilocycle carrier wave signal radiated from the center transmitter 10 and the 2299.58 kilocycle upper side band of the signal radiated by the end transmitter 11 as collected by the antenna 41 are received and heterodyned by the receiver 43 to produce a 420 cycle heterodyne signal which is impressed upon one set of signal input terminals of each of the two mixers 55 and 57. The 2196 kilocycle lower side band component of the signal radiated from the center transmitter 10 and the 2195.76 kilocycle carrier wave radiated from the end transmitter 11 are accepted by the receiver 42 and heterodyned therein to produce a 240 cycle heterodyne signal at the output terminals of this receiver which is impressed upon the input terminals of the filters 45 and 48 and upon the input terminals of the mixer 56. Since only this heterodyne signal is applied to the mixer 56 during this particular interval of operation of the transmitters, no double heterodyne signals are developed thereby. The 240 cycle heterodyne signal is rejected by the filter 45 but is passed by the filter 48 and impressed upon the left hand set of input terminals of the phase meter 49 and also upon one set of signal input terminals of the mixer 57. As indicated above, during periods when the linear amplifier 20a is operating at the center transmitter 10, the 420 cycle and 240 cycle reference signals are carried as modulation components on the 2413.4 kilocycle carrier wave signal radiated from the transmitter 12. This signal is received by the receiver 44 and the two reference signals are reproduced in this receiver to appear at the output terminals thereof. Both reference signals are impressed upon the input terminals of the filters 47 and 50 and upon the input terminals of the mixer 63. They are both rejected by the 600 cycle band pass filter 47. The 240 cycle reference signal is passed by the filter 50 and impressed upon the right hand set of input terminals of the phase meter 49. The filter 50, of course, rejects the 420 cycle reference signal.

It will thus be apparent that during each period when the linear amplifier 20a is effective to produce signal radiation from the center transmitter 10, heterodyne and reference signals both having a frequency of 240 cycles are impressed upon the two sets of input terminals of the phase meter 49. This phase meter, in measuring the phase relationship between the two applied signals, provides an indication of the position of the receiving antenna 41 relative to two adjacent hyperbolic iso-phase lines having the antennas 17 and 30 at the transmitters 10 and 11 as foci. Along the base line connecting the two antennas 17 and 30, the spacing between adjacent iso-phase lines is equal to one-half the wave length of a signal having a frequency of 2195.88 kilocycles, which represents a spacing of 224 feet. The iso-phase lines, of course, diverge to wider spacings at points located on either side of the described base line. However, the lanes between adjacent iso-phase lines are relatively narrow so that the phase meter 49 provides a highly accurate fine or narrow lane indication of the position of the receiving antenna 41 relative to the positions of the radiating antennas 17 and 30.

Coarse or wide lane position indications are provided by facilities including the phase meter 59 in exactly the same manner as these indications are provided by the described facilities including the phase meter 53 during periods when the linear amplifier 20a is operating at the center transmitter 10. Thus, the 240 cycle heterodyne signal appearing at the output terminals of the filter 48 is mixed with the 420 cycle heterodyne signal appearing at the output terminals of the receiver 43 in the mixer 57 to produce a double heterodyne beat frequency signal of 180 cycles which is passed by the filter 58 and impressed upon the left hand set of input terminals of the phase meter 59. Further, the 240 cycle and 420 cycle reference signals developed at the output terminals of the receiver 44 are heterodyned by the mixer 63 to produce a double heterodyne beat frequency signal of 180 cycles which is passed by the filter 60 and applied to the right hand set of input terminals of the phase meter 59. Here again, the coarse or wide lane position indicating facilities operate in accordance with the above referred to difference frequency principle, so that the phase meter 59 provides phase indications relative to widely spaced hyperbolic iso-phase lines having the radiating antennas 17 and 30 as foci. In accordance with the difference frequency principle, the spacing between adjacent iso-phase lines along the base line connecting the antennas 17 and 30 is in this case equal to one-half the wave length of a signal having a frequency of 103.91 kilocycles, i.e., a spacing of approximately 4730 feet, which is some twenty-one times greater than the spacing between the iso-phase lines of the fine grid with reference to which the phase meter 49 provides position indications. Thus, coarse or wide lane position indications are provided by the phase meter 59, the accuracy of which is sufficient to identify the particular pair of iso-phase lines relative to which the phase meter 49 is providing indications.

From the above explanation, it will be understood that as the two linear amplifiers 20a and 20b are alternately rendered operative to effect signal radiation from the center transmitter 10, the two sets of phase meters 46, 53 and 49, 59 are alternately rendered effective to produce position indications relative to two intersecting sets of fine and coarse hyperbolic grid patterns. Thus an absolute determination of the position of the receiving antenna 41 within the area of effective reception of signals radiated from the three transmitters 10, 11 and 12 is obtained. In this regard, it is noted that the switching rate of the switching unit 20 is sufficiently high, of the order of four cycles per second, that the phase meters 46, 49, 53 and 59 tend to retain their settings during the short intervals when they are inactive, thereby effectively providing continuous position indications.

From the foregoing explanation, it will be apparent that the present invention affords a satisfactory solution to the problem of radiating signals from the same radiating antenna for obtaining both coarse and fine position indications without generating undesirable inter-modulation or side band components. Furthermore, this problem has been solved in a simple, economical and reliable manner by the use of inexpensive equipment which does not require accurately designed, expensive elements such as high cost filters and the like. Moreover, the radiation of a plurality of signals from the same transmitting point by the system of the present invention provides a system which employs a minimum number of channel frequencies and yet provides non-ambiguous position indications of improved accuracy to any number of system users.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. A radio position finding system of the hyperbolic, continuous wave type for providing coarse and fine position indications representative of the location of a mobile craft, said system comprising three spaced apart transmitting units; a first of said units including a signal generator for developing a first relatively high frequency signal and first and second signal generators respectively developing first and second relatively low frequency signals, first circuit means for amplitude modulating said first relatively high frequency signal with said first relatively low frequency signal and for eliminating the upper side band of the resulting modulation, second circuit means for amplitude modulating the first relatively high frequency signal with said second low frequency signal and for eliminating the lower side band of the resulting modulation, and means for alternately radiating from said first unit the outputs of the first and second circuit means so that during a first interval of operation the first relatively high frequency signal and the lower side band component from said first circuit means are radiated and during a second interval of operation the first relatively high frequency signal and the upper side band developed by the second circuit means are radiated; a second of said units including signal generating means for developing a second relatively high frequency signal, means for developing a third relatively low frequency signal, means for amplitude modulating said second relatively high frequency signal with said third relatively low frequency and for eliminating the lower side band of the resulting modulation and means for radiating said second relatively high frequency signal and the upper side band component from said second unit; said third unit including means for generating a third relatively high frequency signal, means for developing a fourth relatively low frequency signal, means for amplitude modulating said third relatively high frequency signal with said fourth low frequency signal and for eliminating the upper side band of the modulation, and means for radiating from said third unit said third relatively high frequency signal and the lower side band of the last mentioned modulation; all of said relatively high frequency signals and all of said relatively low frequency signals being of different frequency; means at the second unit for heterodyning the side band component radiated by the first unit during the second interval of operation with the third relatively high frequency signal radiated from the third unit in order to develop a first beat signal; means at the second unit for heterodyning the first relatively high frequency signal radiated from the first unit during the second interval of operation with the side band component radiated from the third unit to develop a second beat signal; means for modulating the second relatively high frequency signal radiated from the second unit with first and second reference signals respectively derived from said first and second beat signals during the second interval of operation; means at the third unit for heterodyning the first relatively high frequency signal radiated by the first unit during the first interval of operation with the side band component radiated by the second unit in order to develop a third beat signal; means at the third unit for heterodyning the second relatively high frequency signal radiated from the second unit with the side band component radiated by the first unit during the first interval of operation in order to develop a fourth beat signal; means for modulating the third relatively high frequency signal radiated from the third unit with third and fourth reference signals respectively derived from the third and fourth beat signals during the first interval of operation; and a receiver unit on the mobile craft jointly responsive to the reference signals and to the relatively high frequency signals and their side band components radiated from all three of the transmitting units for providing during the first interval of operation a coarse position indication and a fine position indication representative of the location of the mobile craft relative to the first and second transmitting units and for providing during the second interval of operation a coarse position indication and a fine position indication representative of the location of the mobile craft relative to the first and third transmitting units.

2. A radio position finding system of the hyperbolic, continuous wave type for providing coarse and fine position indications representative of the location of a mobile craft, said system comprising three spaced apart transmitting units; a first of said units including a signal generator for developing a first relatively high frequency signal and first and second signal generators respectively developing first and second relatively low frequency signals, first circuit means for amplitude modulating said first relatively high frequency signal with said first relatively low frequency signal and for eliminating one side band of the resulting modulation, second circuit means for amplitude modulating the first relatively high frequency signal with said second low frequency signal and for eliminating one side band of the resulting modulation, and means for alternately radiating from said first unit the outputs of the first and second circuit means so that during a first interval of operation the first relatively high frequency signal and the side band component retained by said first circuit means are radiated and during a second interval of operation the first relatively high frequency signal and the side band retained by the second circuit means are radiated; a second of said units including signal generating means for developing a second relatively high frequency signal, means for developing a third relatively low frequency signal, means for amplitude modulating said second relatively high frequency signal with said third relatively low frequency and for eliminating one of the side bands of the resulting modulation, and means for radiating said second relatively high frequency signal and the retained side band component from said second unit; said third unit including means for generating a third relatively high frequency signal, means for developing a fourth relatively low frequency signal, means for amplitude modulating said third relatively high frequency signal with said fourth low frequency signal and for eliminating one of the side bands of the modulation, and means for radiating from said third unit said third relatively high frequency signal and the side band retained from the last mentioned modulation; all of said relatively high frequency signals and all of said relatively low frequency signals being of different frequency; means at the second unit for heterodyning the side band component radiated by the first unit during the second interval of operation with the third relatively high frequency signal radiated from the third unit in order to develop a first beat signal; means at the second unit for heterodyning the first relatively high frequency signal radiated from the first unit during the second interval of operation with the side band component radiated from the third unit to develop a second beat signal; means for modulating the second relatively high frequency signal radiated from the second unit with first and second reference signals respectively derived from said first and second beat signals during the second interval of operation; means at the third unit for heterodyning the first relatively high frequency signal radiated by the first unit during the first interval of operation with the side band component radiated by the second unit in order to develop a third beat signal; means at the third unit for heterodyning the second relatively high frequency signal radiated from the second unit with the side band component radiated by the first unit during the first interval of operation in order to develop a fourth beat signal; means for modulating the third relatively high frequency signal radiated from the third unit with third and fourth reference signals respectively derived from the third and fourth beat signals during the first interval of operation; and a receiver unit on the mobile craft jointly responsive to the reference signals and to the relatively high frequency signals and their side band components radiated from all three of the transmitting units for providing during the first interval of operation a coarse position indication and a fine position indication representative of the location of the mobile craft relative to the first and second transmitting units and for providing during the second interval of operation a coarse position indication and a fine position indication representative of the location of the mobile craft relative to the first and third transmitting units.

3. A transmitting system for use in radio position finding systems of the hyperbolic, continuous wave type adapted to provide coarse and fine position indications representative of the location of a mobile craft, said transmitting system comprising three spaced apart transmitting units; a first of said units including a signal generator for developing a first relatively high frequency signal and first and second signal generators respectively developing first and second relatively low frequency signals, first circuit means for amplitude modulating said first relatively high frequency signal with said first relatively low frequency signal and for eliminating the upper side band of the resulting modulation, second circuit means for amplitude modulating the first relatively high frequency signal with said second low frequency signal and for eliminating the lower side band of the resulting modulation, and means for alternately radiating from said first unit the outputs of the first and second circuit means so that during a first interval of operation the first relatively high frequency signal and the lower side band component from said first circuit means are radiated and during a second interval of operation the first relatively high frequency signal and the upper side band developed by the second circuit means are radiated; a second of said units including signal generating means for developing a second relatively high frequency signal, means for developing a third relatively low frequency signal, means for amplitude modulating said second relatively high frequency signal with said third relatively low frequency and for eliminating the lower side band of the resulting modulation, and means for radiating said second relatively high frequency signal and the upper side band component from said second unit; said third unit including means for generating a third relatively high frequency signal, means for developing a fourth relatively low frequency signal, means for amplitude modulating said third relatively high frequency signal with said fourth low frequency signal and for eliminating the upper side band of the modulation, and means for radiating from said third unit said third relatively high frequency signal and the lower side band of the last mentioned modulation; all of said relatively high frequency signals and all of said relatively low frequency signals being of different frequency; means at the second unit for heterodyning the side band component radiated by the first unit during the second interval of operation with the third relatively high frequency signal radiated from the third unit in order to develop a first beat signal; means at the second unit for heterodyning the first relatively high frequency signal radiated from the first unit during the second interval of operation with the side band component radiated from the third unit to develop a second beat signal; means for modulating the second relatively high frequency signal radiated from the second unit with first and second reference signals respectively derived from said first and second beat signals during the second interval of operation; means at the third unit for heterodyning the first relatively high frequency signal radiated by the first unit during the first interval of operation with the side band component radiated by the second unit in order to develop a third beat signal; means at the third unit for heterodyning the second relatively high frequency signal radiated from the second unit with the side band component radiated by the first unit during the first interval of operation in order to develop a fourth beat signal; and means for modulating the third relatively high frequency signal radiated from the third unit with third and fourth reference signals respectively derived from the third and fourth beat signals during the first interval of operation.

4. A transmitting system for use in radio position finding systems of the hyperbolic, continuous wave type adapted to provide coarse and fine position indications representative of the location of a mobile craft, said transmitting system comprising three spaced apart transmitting units; a first of said units including a signal generator for developing a first relatively high frequency signal and first and second signal generators respectively developing first and second relatively low frequency signals, first circuit means for amplitude modulating said first relatively high frequency signal with said first relatively low frequency signal and for eliminating one side band of the resulting modulation, second circuit means for amplitude modulating the first relatively high frequency signal with said second low frequency signal and for eliminating one side band of the resulting modulation, and means for alternately radiating from said first unit the outputs of the first and second circuit means so that during a first interval of operation the first relatively high frequency signal and the side band component retained by said first circuit means are radiated and during a second interval of operation the first relatively high frequency signal and the side band retained by the second circuit means are radiated; a second of said units including signal generating means for developing a second relatively high frequency signal, mean for developing a third relatively low frequency signal, means for amplitude modulating said second relatively high frequency signal with said third relatively low frequency and for eliminating one of the side bands of the resulting modulation, and means for radiating said second relatively high frequency signal and the upper retained side band component from said second unit, said third unit including means for generating a third relatively high frequency signal, means for developing a fourth relatively low frequency signal, means for amplitude modulating said third relatively high frequency signal with said fourth low frequency signal and for eliminating one of the side bands of the modulation, and means for radiating from said third unit said third relatively high frequency signal and the side band retained from the last mentioned modulation; all of said relatively high frequency signals and all of said relatively low frequency signals being of different frequency; means at the second unit for heterodyning the side band component radiated by the first unit during the second interval of operation with the third relatively high frequency signal radiated from the third unit in order to develop a first beat signal; means at the second unit for heterodyning the first relatively high frequency signal radiated from the first unit during the second interval of operation with the side band component radiated from the third unit to develop a second beat signal; means for modulating the second relatively high frequency signal radiated from the second unit with first and second reference signals respectively derived from said first and second beat signals during the second interval of operation; means at the third unit for heterodyning the first relatively high frequency signal radiated by the first unit during the first interval of operation with the side band component radiated by the second unit in order to develop a third beat signal; means at the third unit for heterodyning the second relatively high frequency signal radiated from the second unit with the side band component radiated by the first unit during the first interval of operation in order to develop a fourth beat signal; and means for modulating the third relatively high frequency signal radiated from the third unit with third and fourth reference signals respectively derived from the third and fourth beat signals during the first interval of operation.

References Cited in the file of this patent

UNITED STATES PATENTS

| | | |
|---|---|---|
| 2,095,050 | Beverage | Oct. 5, 1937 |
| 2,629,091 | Hawkins | Feb. 17, 1953 |
| 2,652,558 | Hawkins | Sept. 15, 1953 |
| 2,652,560 | Hawkins | Sept. 15, 1953 |
| 2,808,504 | Neumann | Oct. 1, 1957 |